Feb. 28, 1956 R. L. DOAN 2,736,197
APPARATUS FOR DETERMINING RELATIVE
PERMEABILITY OF FORMATIONS
Filed Jan. 2, 1951
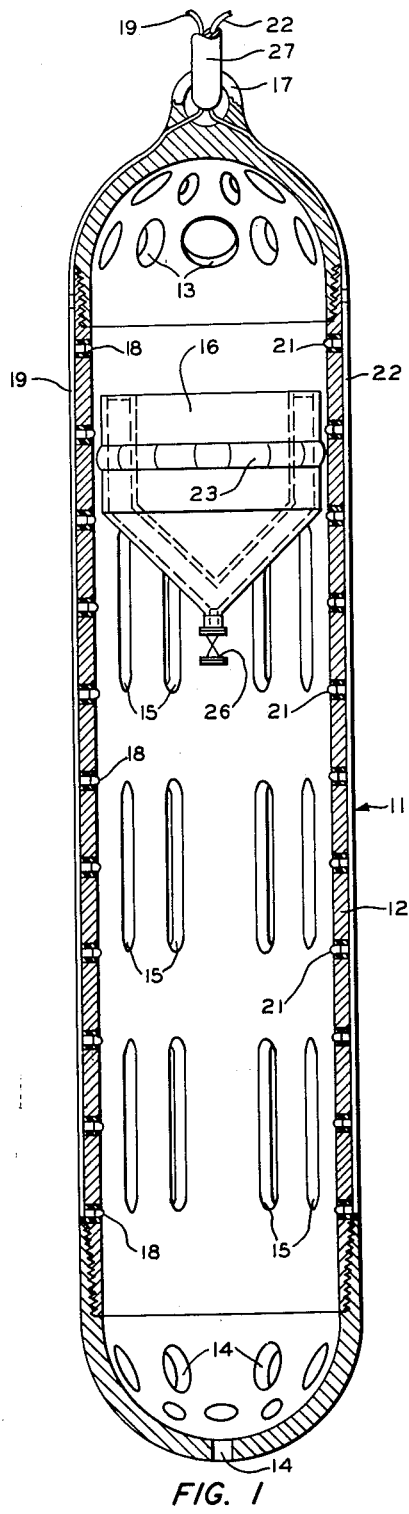
FIG. 1
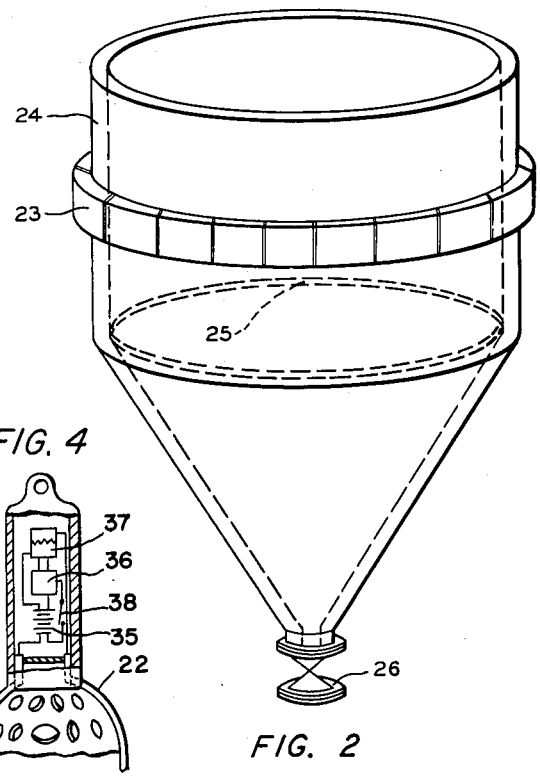
FIG. 2
FIG. 4
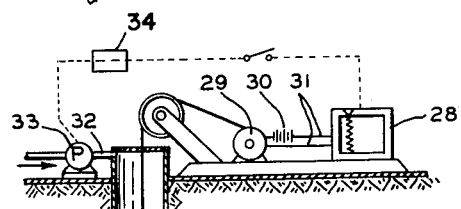
FIG. 3
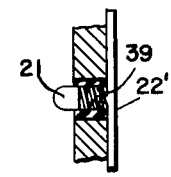
FIG. 5
INVENTOR.
R. L. DOAN
BY Hudson and Young
ATTORNEYS

United States Patent Office 2,736,197
Patented Feb. 28, 1956

2,736,197

APPARATUS FOR DETERMINING RELATIVE PERMEABILITY OF FORMATIONS

Richard L. Doan, Bartlesville, Okla., assignor to Phillips Petroleum Company, a corporation of Delaware Application January 2, 1951, Serial No. 204,002

5 Claims. (Cl. 73—155)

This invention relates to the art of exploring well bores. In one of its more specific aspects it relates to means for determining relative permeability of formations in which a well bore is produced. In another of its more specific aspects it relates to a flow meter for determining relative permeability of formations.

Depletion of pressures in underground formations has led to the development of the practice of replacing depleted pressurizing fluids in subterranean surfaces with other fluids. One form of such operation has become known as "water flooding." In such operation it is desirable to know the relative permeability of formations through which an input well is drilled. By determining what the relative permeability of the formation is, it is possible to, in turn, find out whether or not the formation will take fluid. It is also possible to determine during the introduction of the fluid into the subterranean formation whether too much fluid is being introduced into a given portion of the formation. Additional thereto, it is possible to determine accumulative liquid input so as to determine whether or not a porous formation has been fully flooded.

Determination of relative permeability is not restricted to processes such as water flooding but is also determined so as to enable operators to partially block off formations which are more porous than others or so as to acidify formations which are less porous than others in order to bring about a more uniform porosity of the subterranean formation.

In introducing liquid agents into an earth or rock formation, such as for example, when introducing an acid solution into the porous calcareous formation penetrated by the bore of an oil well, it is conventional practice to attempt to control the level to which the acid rises during its introduction by maintaining the acid solution under a column of oil or the like as it is forced into the formation. It oftentimes happens, however, that the formation adjacent a portion of the oil column is highly porous allowing the oil to escape into the formation with the result that the acid rises in the well bore and escapes into a section of the formation which may be of an unproductive nature or already highly porous. Waste of the treating solution is thus encountered. By determining the relative permeability of the well bore with another liquid before acid introduction, it is possible to plan the proper approach to the problem of adding acid materials to a well bore.

An object of this invention is to provide improved means for determining relative permeability of well bore formations. Another object of the invention is to provide a simplified improved downhole flow meter capable of measuring the rate at which a permeable formation takes injection liquid. Another object of the invention is to provide an improved flow meter for determining relative permeability of well bore formations. Other and further objects will be apparent to those skilled in the art upon study of the accompanying discussion and the drawings.

Broadly speaking, I have conceived of a new and novel flow meter which comprises a tubular member perforate throughout its length, having two sets of electrical contacts disposed at equal distances along the length of the tubular member, the contacts of each group being insulated from the tubular member and being connected to a recorder. The tubular member has an outer diameter which is slightly less than the inner diameter of the casing of the well in which it is to be used. The length of the tubular member is controlled so as to extend for a distance, e. g., 5 feet or more into the length of the uncased portion of the well bore. A mobile contactor is provided so as to be slidably retained within the tubular member. The mobile contactor is adapted so as to have an average density which is substantially that of the liquid material to be introduced into the porous formation of the well bore. The mobile contactor is provided with a conducting element which, upon movement of the mobile contactor through the tubular member, provides means for connecting a contact selected from each of the two series of electrical contacts in the walls of the tubular member. When the tubular member is lowered into the well bore and is passed downwardly through a liquid body therein under a set of given conditions, the mobile contactor is elevated to the top of the tubular member and subsequently moves downwardly through the tubular member with a liquid pumped through the well casing and through the tubular member. As the circuit between the electrical contacts in the tubular member is closed by the conducting element of the mobile contactor, current in the completed circuit is transmitted to a recorder which carries a chart driven in accordance with time. The pen of the recorder is caused to move upon closure of the electrical circuit. It is thus possible to determine the velocity of fluid flow in the well bore, the interval between electrical contacts of each series being known.

Better understanding of the invention will be obtained by those skilled in the art upon reference to the drawings in which Figure 1 is a sectional elevation of the tubular measuring device of this invention. Figure 2 is a broken elevation of a modified mobile contactor of the tubular measuring device. Figure 3 is a schematic representation of a well bore which is partially cased and containing the tubular measuring device of this invention and showing one form of its attachment to the ground surface. Figure 4 is a broken elevation showing a recorder and clock drive assembly for use in the tubular measuring device. Figure 5 is a broken wall section showing a "micro" switch therein.

Referring particularly to the device shown as Figure 1 of the drawings, tubular measuring device 11 comprises shell 12 which is provided with perforations 13 and 14 in its upper and lower ends, respectively. Elongated perforations 15 are provided in the side wall of shell 12 and are spaced along the length thereof. The lower end portion of shell 12 is preferably made so as to be detachable, providing means for entrance into the central portion of shell 12. Mobile contactor 16 is provided within shell 12 and is preferably formed as a hollow cup having a conical bottom and being only slightly smaller in outer diameter than the inner diameter of shell 12. Mobile contactor 16 is introduced into the interior of shell 12 through the bottom thereof and the detachable bottom portion thereof is thereafter replaced so as to retain mobile contactor 16 within the interior of shell 12. Suspension member 17, which may be a ring member affixed to the top of shell 12, provides means for suspending, raising and lowering measuring device 11 in the interior of a well. It is apparent that some other portion of shell 12 may be provided with means for obtaining entrance into shell 12 rather than the bottom portion thereof.

Electrical contact members 18 are provided as one series in the wall of shell 12 and are connected by electrical lead 19 which extends from the lowermost contact member 18 to a suitable recorder. Contact members 18 are spaced at equal distances, such as one foot apart, along the length of shell 12 and extend slightly through the inner wall of shell 12, being insulated from that shell. Contact members 21 are provided in shell 12 and form another series of contacts spaced similarly to members 18 along the length of shell 12, the location of contact members 21 being on substantially the same horizontal cross-section with contact members 18 when tubular measuring device 11 is in an upright position. Contact members 21 extend slightly through the inner wall of shell 12, being insulated from that shell and being connected by electrical lead 22 which extends to the suitable recorder mentioned above, via power source 30. In the modification shown in Figure 1 of the drawings, electrical leads 19 and 22 extend upwardly through the supporting cable 27 for the measuring device 11 to a recorder which is outside of the measuring device 11. In one modification, shown in Figure 4, the recorder is contained within the upper end of the measuring device and is connected to a timer so as to operate independently of any contact at ground level. Mobile contactor 16, when formed of a non-conducting material, is provided with an electrical element 23 which extends around its periphery in such a fashion as to contact both the element 18 and the element 21 at any given contact level. Contact members 18 and members 21 may be connected to the recorder by individual conduits. For simplicity of construction, however, they are connected in two series.

The mobile contactor may be made of any suitable rigid material that will meet the specifications which require that the final structure have approximately the same average density as the liquid to be introduced into the well bore formation. The mobile contactor may be made of a plastic material and if such material is used, electrical element 23 is a necessity. A metal may also be used but, as is obvious, ordinarily a metal will be of normally greater density than the liquid to be injected into the well bore formation. If the mobile contactor is formed of a conducting material, care must be taken to see that its length is less than the distance between the electrical contacts in the side wall of the tubular member.

One type of metal mobile contactor is specifically shown as Figure 2 of the drawings. In that modification the shell 24 of the mobile contactor is made of metal which will conduct an electric current. In this modification, it is obvious that the outer diameter of shell 24 may be such as to contact electrical contacts 18 and 21 so as to obviate the necessity for electrical element 23. Shell 24 may, however, be provided with a narrow peripheral shoulder which will considerably cut down on the amount of drag of the mobile contactor through the tubular shell 12. Where a distinct electrical element 23 is utilized on a metal mobile contactor it is at times desirable to provide an insulation covering over the remaining portion of the contactor. In the specific modification of the mobile contactor shown in Figure 2, the bottom portion of that member is closed by a plate 25 which provides a chamber in the bottom end of the mobile contactor. A valve 26 is provided in that chamber so as to provide means for introducing or removing a material, such as a light gas, a heavy fluid, or even metal pellets, which will increase or decrease the buoyancy of the contactor. With a device such as this, it is possible to obtain substantially the same average density for the mobile contactor as is possessed by the liquid introduced into the well bore formation. A similar type of structure may be made from a material which normally floats in the liquid to be introduced into the well bore formation and a material may be introduced into such a member which will provide the mobile contactor with substantially the same average density as that possessed by the liquid to be introduced. A slightly modified structure may be provided by inserting a cup member having a smaller diameter into shell 24 and sealing the two together at their upper ends. A completely hollow walled contactor is thus formed for receiving fluids to change its average density.

Tubular measuring device 11 is of a length such that it is somewhat longer than the uncased portion of the well bore. As schematically shown in Figure 3 of the drawings, when measuring device 11 is lowered into the well bore, a portion of the measuring device extends upwardly into the well casing 20. The diameter of the casing and of the well bore is substantially the same. Measuring device 11 is preferably provided with a supporting cable 27 which extends upwardly to the earth surface and provides means for raising and lowering the measuring device within the well bore. In one modification, as shown in Figure 1 of the drawings, the electrical conduits 19 and 22 form a portion of the elevational cable and are connected to recorder 28 at the ground surface through winch 29 and electrical leads 31 which extend between winch 29 and recorder 28. Power source 30 is provided in one of the conduits 31. Liquid inlet means 32 is schematically shown in Figure 3 of the drawings at a point above the ground level for the purpose of introducing liquid into the well bore. Pump 33 is provided in conduit 32 so as to provide the injection liquid to the well bore at a constant volume and pressure.

In the operation of the device of this invention by means of the process of this invention, I prefer to inject a liquid, such as water, into the well bore so as to fill the casing with that liquid. Tubular measuring device 11 is then lowered by means of line 27 or some similar connecting means or is dropped into the well bore and is allowed to travel through the body of liquid until it comes to rest at the bottom of the well bore. As pointed out above, the upper end of tubular measuring device 11 is retained within the confines of casing 20. As measuring device 11 travels downwardly through the liquid within casing 20, mobile contactor 16 is caused to rise in measuring device 11 until it comes to rest against the upper end portion of that device. As measuring device 11 comes to rest, such as at the bottom of the well bore, mobile contactor 16 begins its downward travel at the same rate as the injected liquid is flowing through the measuring device 11, the liquid being introduced into the measuring device through perforations 13 in the upper end of shell 12 and through perforations 15 in its sidewall. As mobile contactor 16 passes downwardly through shell 12, electrical elements 23 successively contacts individual contact members 18 and 21 so as to complete a circuit with the recorder 28. As the circuit is completed, the needle arm of the recorder is caused to make a stroke across a portion of the chart and return to its original position. The chart moves at a constant rate of speed and thus as mobile contactor 16 passes downwardly through measuring device 11 and successively completes the circuit between contact members 18 and 21, the time which it takes for mobile contactor 16 to pass from one set of contact members to the next subsequent set is plotted on a graph which shows the relative flow of liquid into the well bore formations.

It should be noted that the liquid injection rate is constant. As mobile contractor 16 flows downwardly through tubular measuring device 11, it flows at a constant rate until it reaches a permeable formation. As the contactor passes permeable zones in the exposed formation, its rate of travel through measuring device 11 will decrease since a portion of the liquid being pumped into the well bore passes out of the measuring device 11 at points above contactor 16 and into the porous formation. It is thus possible to read from the chart a clear picture of the relative permeability of the well bore formation. If there is a uniform increase in the time which it takes for the contactor to come into contact with successive sets of electrical contacts 18 and 21, the relative permeability of the formation is substantially uniform. If the rate of passage of contactor 16 remains constant for a while, then materially decreases over a short space of passage and subsequently uniformly decreases, such a reading would indicate first, that the upper portion of the formation is relatively impervious, second, that the sudden change was due to a formation structure which was more porous than the other structures encountered and, third, the subsequent formations have substantially uniform porosities.

Although the method described hereinbefore utilizes constant recorder speed and constant pump speed and pressure, I am not restricted to that type of operation. Recorder 28 is in some instances operatively connected through a controller 34 to pump 33. As the speed of operation of pump 33 varies, the speed at which recorder 28 is operated also varies.

A completely self-contained recording unit can be constructed in a portion of tubular measuring device 11 as shown in Figure 4. Battery 35 and a tape recorder 37 are mounted in an air-tight housing in measuring device. The clock drive 36 for the tape recorder is thus started at the surface by closing switch 38 and the tube is dropped into the liquid filled hole. When the measuring device reaches the bottom of the hole, the downward descent of contactor 16 is recorded on the tape. The measuring device can be removed from the hole by use of a spear or the like if a line is not originally attached thereto.

A recheck on the relative porosity of the formation can be obtained by raising the measuring device a short distance in the hole and once again lowering it until it rests upon the bottom of the well bore or is positioned within the uncased well bore.

As will be obvious to those skilled in the art, various modifications of this invention can be made or followed in the light of the foregoing disclosure and discussion without departing from the spirit or scope of the disclosure. Although I have described this invention in particular with electrical contacts extending through the wall of shell 12, it is within the scope of this invention to replace those contacts with switches, such as very sensitive "micro" switches, shown in Figure 5. In that figure, contact 21 is depressed against spring 39 so as to be closed against contact 22'. As the mobile contactor moves on, contact 21 and contact 22' are forced apart by spring 39.

I claim:

1. An improved downhole flow meter comprising an elongated shell being perforate throughout its length and having a zone of its interior of uniform cross section; a first plurality of electrical contacts extending through the inner wall of said shell, equally spaced along the length of said shell and being insulated therefrom; a second plurality of electrical contacts extending through the inner wall of said shell, being equally spaced along the length of said shell, being insulated therefrom and an electrical contact of said second plurality being in substantially the same horizontal plane with each contact of said first plurality when said shell is in an upright position; a mobile contactor having a horizontal cross-section but slightly smaller and enclosed and retained within said zone of uniform cross-section formed within said shell; a conducting element on said mobile contactor extending from one side thereof to the other and adapted so as to contact an electrical contact of said first and second plurality of contacts on the same plane; a recorder; and electrical leads connecting said first and second plurality of electrical contacts to said recorder.

2. The downhole flow meter of claim 1 wherein said mobile contactor is an open topped cup having a pair of spaced-apart walls forming a closed hollow chamber in a portion of its length; and a valve member is provided in the wall of said hollow chamber portion.

3. The downhole flow meter of claim 2 wherein the outer wall of said mobile contactor is insulated; and said electrical conducting element extends outwardly beyond said insulation.

4. An apparatus for determining relative permeability of formations penetrated by a well bore which comprises, in combination: an elongated flow meter comprising a shell perforate throughout its length and containing a mobile contactor free to move through the length of said shell, said mobile contactor having a conducting element thereon extending from one side thereof to the other and adapted to contact opposing pairs of electrical contacts extending through the inner wall of said shell at equally spaced intervals along the length of said shell; means for introducing a first liquid into said well bore so as to form a liquid head in said well bore; means for lowering said flow meter into said well bore and into said head of liquid to a position adjacent said formations the permeability of which is to be determined, so as to cause said mobile contactor to be elevated to the upper end of said shell; means for introducing additional liquid into said well bore under such pressure as to force said first liquid into said formations and to force said mobile contactor downwardly through said shell at the rate of flow of said liquid in said well bore; means including a recorder for recording the rate of downward travel of said mobile contactor through said shell; and means for operating said recorder at a rate of speed which is in direct response to the rate of input of said additional liquid to said well bore.

5. An apparatus for determining relative permeability of formations penetrated by a well bore which comprises, in combination: an elongated flow meter comprising a shell perforate throughout its length and containing a mobile contactor free to move through the length of said shell, said mobile contactor having a conducting element thereon extending from one side thereof to the other and adapted to contact opposing pairs of electrical contacts extending through the inner wall of said shell at equally spaced intervals along the length of said shell; means for introducing a first liquid into said well bore so as to form a liquid head in said well bore; means for lowering said flow meter into said well bore and into said head of liquid to a position adjacent said formations the permeability of which is to be determined, so as to cause said mobile contactor to be elevated to the upper end of said shell; means for introducing additional liquid into said well bore under such pressure as to force said first liquid into said formations and to force said mobile contactor downwardly through said shell at the rate of flow of said liquid in said well bore; means including a recorder for recording the rate of downward travel of said mobile contactor through said shell; and means for operating said recorder at a constant rate of speed.

References Cited in the file of this patent

UNITED STATES PATENTS

| | | |
|---|---|---|
| 442,962 | Eichhorn | Dec. 16, 1890 |
| 2,289,202 | McCoy | July 7, 1942 |
| 2,348,192 | Chambers | May 9, 1944 |
| 2,379,138 | Fitting et al. | June 26, 1945 |

FOREIGN PATENTS

| | | |
|---|---|---|
| 588,705 | Great Britain | May 30, 1947 |